(12) United States Patent
Lampl (10) Patent No.: US 12,343,230 B2
(45) Date of Patent: Jul. 1, 2025

(54) PARTIAL DENTAL PROSTHESIS

(71) Applicant: edelweiss dentistry products gmbh, Wolfurt (AT)

(72) Inventor: Stephan Lampl, Kriessern (CH)

(73) Assignee: edelweiss dentistry products gmbh, Wolfurt (AT)

( * ) Notice: Subject to any disclaimer, the term of this patent is extended or adjusted under 35 U.S.C. 154(b) by 1097 days.

(21) Appl. No.: 16/777,338

(22) Filed: Jan. 30, 2020

(65) Prior Publication Data

US 2020/0163741 A1    May 28, 2020

Related U.S. Application Data

(62) Division of application No. 14/771,013, filed as application No. PCT/AT2014/000025 on Feb. 6, 2014, now abandoned.

(30) Foreign Application Priority Data

Feb. 27, 2013    (AT) ...................................... 151/2013

(51) Int. Cl.
*A61C 5/73* (2017.01)
*A61C 5/70* (2017.01)
(Continued)

(52) U.S. Cl.
CPC .................. *A61C 5/73* (2017.02); *A61C 5/70* (2017.02); *A61C 13/0018* (2013.01);
(Continued)

(58) Field of Classification Search
CPC ......... A61C 5/73; A61C 5/70; A61C 13/0018; A61C 13/087; A61C 13/09; A61C 13/26; A61C 13/097; B26C 65/16
See application file for complete search history.

(56) References Cited

U.S. PATENT DOCUMENTS 3,423,823 A    1/1969 Ansley
3,423,828 A    1/1969 Halpern et al.
(Continued)

FOREIGN PATENT DOCUMENTS

AU    642780    5/1992
CA    2074128    4/1998
(Continued)

OTHER PUBLICATIONS

Catalogue Heraeus Kulzer GmbH, 16 pages, Feb. 2011.
(Continued)

*Primary Examiner* — Nicholas D Lucchesi
*Assistant Examiner* — Hao D Mai
(74) *Attorney, Agent, or Firm* — Volpe Koenig (57) ABSTRACT

A method for producing partial dental prosthesis having at least one surface for forming a chewing surface of a posterior tooth is provided. The method includes (i) providing a composite material with at least one organic binding agent and solid particles that consist of glass as filler; and (ii) applying a laser to at least some regions of a surface of the chewing surface such that the at least one organic binding agent is burnt off in laser-treated regions and the solid particles are melted and fused together to form a continuous enamel layer.

15 Claims, 3 Drawing Sheets

(51) Int. Cl.

| | |
|---|---|
| *A61C 13/00* | (2006.01) |
| *A61C 13/087* | (2006.01) |
| *A61C 13/09* | (2006.01) |
| *A61C 13/097* | (2006.01) |
| *A61C 13/271* | (2006.01) |
| *B29C 65/16* | (2006.01) |

(52) U.S. Cl.
  CPC ............ *A61C 13/087* (2013.01); *A61C 13/09* (2013.01); *A61C 13/26* (2013.01); *B29C 65/16* (2013.01); *A61C 13/097* (2013.01)

(56) References Cited

U.S. PATENT DOCUMENTS

| | | | |
|---|---|---|---|
| 3,766,650 | A | 10/1973 | Gnecco |
| 3,986,261 | A | 10/1976 | Faunce |
| 4,226,593 | A | 10/1980 | Cohen et al. |
| 4,433,959 | A | 2/1984 | Faunce |
| 4,544,359 | A | 10/1985 | Waknine |
| 5,080,589 | A | 1/1992 | Oden et al. |
| 5,171,149 | A | 12/1992 | Alpert |
| 5,217,375 | A | 6/1993 | Oden et al. |
| 5,433,941 | A * | 7/1995 | Patel ................... C23C 18/143 106/35 |
| RE35,264 | E | 4/1996 | Bennett |
| 5,510,066 | A | 4/1996 | Fink et al. |
| 5,708,051 | A | 1/1998 | Erdrich et al. |
| 5,738,678 | A | 4/1998 | Patel |
| 6,174,935 | B1 | 1/2001 | Matsunae et al. |
| 6,382,980 | B1 | 5/2002 | Schoher et al. |
| 6,444,724 | B1 | 9/2002 | Stangel et al. |
| 7,189,076 | B1 | 3/2007 | Rosenfeld |
| 7,691,497 | B1 | 4/2010 | Brodkin et al. |
| 2002/0064749 | A1 | 5/2002 | Didler et al. |
| 2002/0152930 | A1 | 10/2002 | Neubert et al. |
| 2003/0125189 | A1 | 7/2003 | Castro et al. |
| 2003/0215770 | A1 | 11/2003 | Sekino et al. |
| 2004/0096805 | A1 | 5/2004 | Saito et al. |
| 2004/0106087 | A1 | 6/2004 | Weigl et al. |
| 2004/0241609 | A1 | 12/2004 | Jia et al. |
| 2005/0069838 | A1 | 3/2005 | Kollefrath et al. |
| 2005/0227204 | A1 | 10/2005 | Hauck |
| 2006/0257823 | A1 | 11/2006 | Pfeiffer et al. |
| 2006/0257824 | A1 | 11/2006 | Pfeiffer et al. |
| 2007/0142495 | A1 | 6/2007 | Neffgen et al. |
| 2007/0231364 | A1 | 10/2007 | Nishimoto et al. |
| 2008/0213727 | A1 | 9/2008 | Zhang et al. |
| 2009/0035723 | A1 | 2/2009 | Daniel et al. |
| 2009/0191512 | A1 | 7/2009 | Yarovesky |
| 2009/0305195 | A1 | 12/2009 | Jones et al. |
| 2010/0021867 | A1 | 1/2010 | Altshuler et al. |
| 2010/0143868 | A1 | 6/2010 | Hintersehr |
| 2011/0104643 | A1 | 5/2011 | Giordano |
| 2011/0207087 | A1 | 8/2011 | Jones et al. |
| 2012/0276503 | A1 | 11/2012 | Wang et al. |
| 2013/0115573 | A1 | 5/2013 | Lamp |
| 2013/0180110 | A1 | 7/2013 | Schechner et al. |
| 2013/0216787 | A1 | 8/2013 | Yeh et al. |
| 2013/0224688 | A1 | 8/2013 | Mayr et al. |
| 2013/0273501 | A1 | 10/2013 | Cascone et al. |
| 2015/0104665 | A1 | 4/2015 | Beeby |
| 2015/0216636 | A1 | 8/2015 | Nakamura et al. |
| 2015/0320525 | A1 | 11/2015 | Lin et al. |
| 2016/0008093 | A1 | 1/2016 | Lampl |

FOREIGN PATENT DOCUMENTS

| | | |
|---|---|---|
| CN | 1607926 | 4/2005 |
| DE | 3525720 | 6/1986 |
| DE | 19654055 | 6/1998 |
| DE | 19859989 | 7/1999 |
| DE | 19807631 | 8/1999 |
| DE | 10234994 | 2/2004 |
| DE | 102005023106 | 11/2006 |
| EP | 0486774 | 8/1991 |
| EP | 0523545 | 7/1992 |
| EP | 0717976 | 6/1996 |
| EP | 0850601 | 7/1998 |
| EP | 1234567 | 8/2002 |
| EP | 2272458 | 1/2011 |
| JP | H08112296 | 5/1996 |
| JP | 2011083448 | 4/2011 |
| WO | DM/075071 | 12/2010 |
| WO | 2012000006 | 1/2012 |
| WO | 2012064620 | 5/2012 |

OTHER PUBLICATIONS

Catalogue bredent Visio.Lign, 12 pages, Jul. 2009.
Catalogue bredent Visio.Lign Veneering System, 6 pages, Jun. 2011.
Catalogue bredent Visio.Lign Toolkit Composite Finishing Set, 4 pages, Jan. 2011.
Bergmann et al., J. Continuing Dental Education 12, Jahrgang, "Kompisit—Entscheidend ist die Rezeptur", 13 pages, and English translation, 30 pages, Jun. 2009.
Komposit (Zahnmedizin); Author unknown, date unknown, 9 pages. Text is based in whole or in part on the Flexikon (http://flexikon.doccheck.com) and English translation of the article, 15 pages. (01.01.2012).
Helpin, et al., "Laboratory Technique for the Laminate Veneer Restoration", Pediatric Denistry, The American Academy of Pedodontics, vol. 4, No. 1, 1982.
8 photographs of a "Mastique" system. (Jan. 1, 2012).
Report Health 3—"Tooth Veneer has her Smiling", Ottawa Citizen, Mar. 17, 1981.
Instruction for Use Mastique Laminates Dentsply—Google Scholar No. 1 to 9. (Jan. 1, 2012).
Walls, et al., "Composite Laminate Veneers: A Clinical Study", Journal of Oral Rehabilitation, Sep. 1988.
Mastique Laminate Veneers: Results after 4 and 10 years of service, http://informahealthcare.com/doi/abs/10.3109/00016359509005988, 1995.
"Compatibility of Elastomeric Impression Materials for Use as Soft Tissue Casts", The Journal of Prosthetic Denistry, 1996.
Leary, Bruce A., DDS, "The Laminate Veneer Restoration—Affordable Esthetics for the Elderly", Special Care in Denistry, Sep. 1981.
Bennett, Richard, J., "Dental Adhesive System", Jun. 4, 1996.
Barnes, Douglas M., et al., Journal of Esthetic and Restorative Denistry, Clinical Evaluation of Castable Ceramic Veneers, 1992.
Gunawan, Atmadja, "Depth of Polymerization of Visible Light Activated Composite Resins", 1986, http://hdl.handle.net/2123/4589, 1986.
Kumar, et al., "Physical Properties and Clinical Characteristics of Ceramic Brackets: a Comprehensive Review", Jan. 1, 2007.
Ullmann's Encyclopedia of Industrial Chemistry, http://onlinelibrary.wiley.com/doi/10.1002/14356007.ao1_221.pub2, 2002.
Haas, Bruce R., DDS, Journal of the New Jersey Dental Association/Fall 1982, Mastique Veneers: A Cosmetic and Financial Alternative in Post-Periodontal Care. (1982).
References Veneers, Abstracts for LEARY, Bruce A., DDS, "Affordance Esthetics for the Elderly, etc.," 8 pages, Sep. 1981.
Walls, et al., Materials Science, "The Bond Strength of Composite Laminate Veneers", J. Dent Res: 1261-1264, 3 pages, Oct. 1985.
Lim, Ching Chiat, "The Marginal Adaptation of 3 Ceramic Veneer Techniques: An in-Vitro Study", Department of Operative Dentistry—Faculty of Dentistry—University of Sydney, 10 pages, 1993.
Dietschi, et al., The European Journal of Esthetic Dentistry, Prefabricated Composite Veneers: Historical Perspectives, Indications and Clinical Application, vol. 6, No. 2, http://www.ultradent.com/edelweiss/resources/Documents/Studies/Dietschi_editorial.pdf. Sep. 2011.
Catalogue bredent Visio.Lign Veneering System, 8 pages, Jun. 2011.
USPTO Office Action dated Mar. 7, 2016, in U.S. Appl. No. 13/730,946.
USPTO Office Action dated Oct. 7, 2016, in U.S. Appl. No. 13/730,946.

(56) References Cited

OTHER PUBLICATIONS

Thomson Gale. "Porcelain—Background, Raw Materials, The Manufacturing, Quality Control." Dec. 31, 2006. "How Products Are Made." pp. 1-5.
"Selective laser sintering" on Wikipedia, Apr. 1, 2010 (Year: 2010).

* cited by examiner

PARTIAL DENTAL PROSTHESIS

CROSS REFERENCE TO RELATED APPLICATIONS

This application is a divisional application of U.S. patent application Ser. No. 14/771,013, filed Aug. 27, 2015, which is a 371 National Stage entry of PCT/AT2014/000025, filed Feb. 6, 2014, which claims priority to Austrian Application No. A 151/2013 filed Feb. 27, 2013, which are incorporated by reference as if fully set forth.

BACKGROUND

The present invention relates to a partial dental prosthesis having at least one surface for forming a chewing surface of a posterior tooth, wherein the partial dental prosthesis comprises a composite material and the composite material contains at least one organic binding agent, preferably methacrylate, and, preferably inorganic, solid particles as filler.

There is an increasing demand in the field of dentistry nowadays to correct impairments. For many patients, teeth grinding or bruxism and/or pressing the teeth together induces wear or abrasion of the teeth and, in particular, of the posterior teeth or molars. Teeth grinding or bruxism and pressing the teeth together is usually carried out subconsciously and often at night and for a relatively long period of time, potentially resulting in a considerable malalignment, which overstrains the periodontium and, in addition, damages the mandibular joint, the masticatory muscles, and other muscle groups as well, which must be flexed in order to stabilize the head. This can result in severe pain symptoms and ringing in the ears or tinnitus. Other common symptoms are vertigo, impaired vision, and nausea. In the German literature, the pain symptoms are referred to as craniomandibular dysfunction.

In the prior art it is known to use so-called guard therapy to prevent nighttime teeth grinding. To this end, appropriately produced guards are placed between the abraded teeth of the upper and the lower jaw, i.e. teeth that are already damaged by wear, wherein these guards correct the malalignment that has already occurred. This is only possible at night, however, and therefore the actual cause and the actual problem cannot be eliminated.

The abrasion is particularly severe in the region of the posterior teeth and the molars. At these sites, the original chewing surfaces in many patients have already been more or less completely worn away.

In the prior art it is already known to replace the parts of the posterior teeth that are missing due to abrasion with partial dental prostheses, by placing the partial dental prostheses onto the posterior teeth and thereby creating a posterior tooth that is once more higher overall. In this case, the partial dental prostheses form, at least inter alia, a surface for forming the chewing surface of the posterior tooth. In the prior art, the partial dental prostheses required for this are produced individually by hand by the dental technician. It is particularly labor-intensive to create a surface configuration of the chewing surface that is at least nearly natural, i.e. to match the protuberances and fissures of the chewing surface that are present in the natural tooth. In the prior art, the dental technician produces the partial dental prostheses from metal, e.g. from gold, ceramic, or plastic.

Partial dental prostheses of the type in question are known from US 2004/096805 A1.

SUMMARY

The objective addressed by the invention is that of providing partial dental prostheses of the aforementioned type, i.e. partial dental prostheses for posterior teeth, which can be used particularly easily and cost-effectively to correct the aforementioned damage and which are particularly robust and stable for daily chewing.

To this end, it is provided according to the invention that at least the surface for forming the chewing surface, preferably the entire outwardly facing surface of the partial dental prosthesis, is formed at least in some regions, preferably completely, by a layer that comprises fused-together solid particles.

The invention is therefore based on the fundamental finding that it is possible to use the aforementioned composite material to create a partial prosthesis which can be produced relatively inexpensively and, above all, can be used universally, and which has at least one surface for forming a chewing surface of a posterior tooth. The aforementioned composite material is convincing in practical applications by virtue of its excellent physical properties for the field of application and also by being easy to apply onto the particular posterior tooth that has been damaged by abrasion. Surprisingly, it has been shown that partial dental prostheses according to the invention made from the aforementioned composite material are also so stable over the long term that these partial dental prostheses persistently withstand the very high forces that occur in the region of the posterior teeth and the molars during chewing. By using partial dental prostheses according to the invention, which are particularly easy to apply, as is illustrated in the following in detail, it is possible to quickly and permanently correct the aforementioned problems caused by abrasion of the posterior teeth in the application.

According to particularly preferred embodiments of the invention, the partial dental prostheses are prefabricated, i.e. preassembled, partial prostheses. These prefabricated products have at least one surface for forming the chewing surface of the posterior tooth. In addition, said prefabricated products can also have side walls that are more or less long. They can be designed in the shape of a hollow crown, in which the side walls surround a hollow space of the hollow crown and are designed to extend down to the patient's gums. These hollow crowns are used, in particular, when only a stump of the posterior tooth remains or the posterior tooth can only be placed onto an artificially inserted implant. If the posterior teeth to be treated are shortened by the abrasion only in the vertical extension thereof, however, the partial dental prostheses can also be formed as shells. The side walls of these shells, if they are present, do not extend down to the gums. In this case, the side walls that may be present are therefore provided or formed to extend, at most incompletely, down to the patient's gums. The partial dental prostheses, which are designed more as flat, shell-type formed bodies, in which the side walls do not extend down to the gums, can also be referred to as onlays or overlays. The composite material is often also referred to as composite.

It was found that it is sufficient to provide sets of appropriately prefabricated partial dental prostheses for treating the posterior teeth. Such a set can have at least one prefabricated, i.e. preassembled, partial dental prosthesis for each posterior tooth, in three different sizes in each case, thereby making it possible to treat or veneer more or less all or at least most of the natural tooth shapes found in patients.

In order to design the surface for forming the chewing surface of the posterior tooth of the partial dental prosthesis so as to appear as natural as a natural tooth as possible, it is provided according to preferred variants that the surface for forming the chewing surface comprises protuberances and fissures extending between the protuberances. The arrangement of the protuberances and fissures is advantageously based on natural examples. In order to design the partial dental prosthesis to be particularly robust and stable for daily chewing, it is provided according to the invention, as mentioned above, that at least the surface for forming the chewing surface of the partial dental prosthesis is formed at least in some regions, preferably completely, by a layer that comprises fused-together solid particles. This fusion could also be referred to as sintering. This can be carried out only for the surface for forming the chewing surface or can also be carried out for the entire outwardly facing surface of the partial dental prosthesis. Particularly preferably, it is provided in this context that the layer is formed exclusively from fused-together solid particles. The layer of fused solid particles can be advantageously formed as a continuous enamel layer. Advantageously, the fused-together solid particles were completely melted during the production of the aforementioned layer and, therefore, the solid particles are not at all individually recognizable in the cured layer. As is provided in preferred embodiments and as described below, if the solid particles are glass or a mixture of different types of glass, the aforementioned layer forms a preferably continuous, glazed surface, thereby making this surface particularly stable and permanently durable.

According to particularly preferred variants of the invention, at least the surface for forming the chewing surface, preferably the entire outwardly facing surface of the partial dental prosthesis, is laser-treated at least in some regions. It is therefore possible to provide a method in which at least the surface for forming the chewing surface, preferably the entire outwardly facing surface of the partial dental prosthesis, is treated by means of laser radiation. In this laser radiation, the organic binding agent is preferably burnt out in the region of the aforementioned surface and the solid particles are melted and fused together such that, in the end, a continuous enamel layer preferably forms, which is ultimately formed, at least substantially, but preferably completely, from fused-together and/or completely melted solid particles.

The partial dental prostheses according to the invention are preferably designed to be X-ray opaque. In order to create an antibacterial surface in the region of the chewing surface, it is provided according to particularly preferred variants of the invention that at least the surface for forming the chewing surface comprises portions of zinc and/or fluorine in the solid particles. In all, an inorganic surface can be formed in which there is no more organic material present, i.e. there is also no more organic binding agent present.

It is advantageous, in particular, when the solid particles of the filler comprise glass or consist of glass, preferably a mixture of different types of glass. The types of glass can be silanized and can differ in terms of their color and their composition. For example, it is conceivable to use barium glasses or strontium glasses or mixtures thereof. In general, this can be surface-treated $SiO_2$. In order to achieve a high strength of the partial dental prosthesis, it is advantageous to arrange the solid particles of the filler so as to be packed as densely as possible in the partial dental prosthesis. To this end, it is advantageous if the filler comprises solid particles having particles sizes that differ from one another. Generally speaking, it is provided according to preferred embodiments that the particle sizes of the solid particles of the filler are in a range between 0.01 μm and 50 μm. However, in order to achieve the highest packing density possible, the small particle sizes are also important in particular, since these fill the intermediate spaces between the larger particles. In this sense, it is advantageous if the filler comprises solid particles having particle sizes between 0.01 μm and 3 μm. In the sense of robustness, it is also important to aim for the highest possible filling ratio of the composite material of the partial dental prosthesis. The portion of solid particles of the filler relative to the composite material should also be as high as possible. In this context, it is provided according to preferred embodiments that the volume fraction of solid particles relative to the composite material is at least 78%. Preferably, this volume fraction of solid particles outside of the optionally provided layer having the fused or melted solid particles is in the range between 78% and 85%. In the layer formed from or comprising fused or melted solid particles, this volume fraction of the material of the solid particles is naturally even higher and approaches or reaches 100%. For the sake of completeness, it should be noted that the solid particles (apart from the layer in which these solid particles are melted or fused) in the composite material are incorporated into the organic binding agent and are held together by said organic binding agent.

According to preferred embodiments of the invention, methacrylate-based binding agents are used as organic binding agents. These can consist of methacrylate or can comprise methacrylate, preferably as the main component.

The product referred to as REF 2061, which is available from Indigodental GmbH & Co. KG in Pinneberg, Germany, can be used as the composite material for the production of the partial dental prosthesis. This product contains triethylene glycol dimethacrylate, urethane dimethacrylate, Bis-GMA, and ethoxylated bisphenol A dimethacrylate. The product REF 2050, for example, from this company can be used as the organic binding agent.

When the partial dental prostheses are applied on the posterior teeth, it is important to form the color of the partial prosthesis such that this color is appropriate for the unique conditions in the patient's mouth and, above all, matches the color of the natural tooth substance that still remains. According to preferred embodiments of the invention, the partial dental prosthesis has a standard color that comes close to the color of natural tooth enamel. Particularly preferably, it is provided in this sense that the partial dental prosthesis is designed to be translucent or transparent, i.e. not opaque, to visible light. One idea is to match the color by using an attachment material that has been suitably tinted for the particular situation, wherein, when the partial dental prosthesis is applied, this attachment material is disposed between said partial dental prosthesis and the tooth or the tooth stump and appears through the translucent partial prosthesis and therefore decisively affects the final outwardly perceptible color of the overall structure. Investigations have shown that the partial prostheses advantageously have a translucence of 28% to 39% and/or an L value of 59 to 69 and/or an a value of −0.35 to −3.2 and/or a b value of −0.4 to −6.95. The translucence is the light transmittance, i.e. the reciprocal property of opacity. The aforementioned values are based on a measurement carried out according to DIN 6174. The Lab color space is also known in the prior art. This is designed on the basis of the color-opponent theory and permits the colorimetric determination of color coordinates and color differences in the approximately uniform CIELAB color space. The L value, the a value, and the b value are also determined according to the requirements of DIN 6174. According to the color-opponent theory, green and red are located opposite one another on the a axis in this case. The b axis corresponds to the opponent colors blue and yellow. The L axis is perpendicular to this plane and represents the lightness.

Advantageously, the same composite material is used for the attachment material as was used to form the partial dental prosthesis, apart from the fused or melted or sintered layer that may be present. Organic pigments and/or inorganic softening agents such as TIO2, for example, can be used as dyes, in particular for coloring the attachment material.

Due to their high strength, the partial dental prostheses can be designed to be relatively thin. According to preferred variants, the partial dental prosthesis has a thickness between 0.3 mm and 0.6 mm in the region of the surface for forming the chewing surface of the posterior tooth. The thickness of the partial dental prosthesis in the region of the side walls is advantageously between 0.1 mm and 0.25 mm.

In order to apply the partial dental prosthesis, the user can use this preassembled product such that, in a manner described in detail further below, the user first processes or specifically grinds the posterior tooth, or the stump thereof, to be veneered, if necessary and initially in the manner known hitherto, and slightly etches said posterior tooth using a suitable etching agent in order to etch away the lubricating layer caused by the drilling or grinding and to expose the tubuli. Suitable etching agents or etching gels are, e.g., 15-37% phosphoric acids or the product REF2052 from the aforementioned company. An adhesion promoter, i.e. so-called bonding, is then preferably applied onto the etched posterior tooth. It is also conceivable to use already-prepared mixtures of etching agent and adhesion promoter. In general, the adhesion promoters or the bonding can be low-molecular methacrylates. It is also possible to use monomers that have a hydrophilic or a hydrophobic end, such as, e.g., methacrylated polyacrylic acids. The products referred to as REF 2050 and REF 2051, for example, from the aforementioned company Indigodental GmbH & Co KG can be used as the adhesion promoters. The product REF2051 is a BIS-GMA-based methacrylate. The attachment material can then be applied onto the layer of the adhesion promoter The height of the partial dental prosthesis above the abraded posterior tooth can be set by means of the amount of the attachment material. The greater the quantity of attachment material that is introduced underneath the partial dental prosthesis or into the hollow space thereof, the greater the final spacing is between the partial dental prosthesis and the posterior tooth veneered thereby. Preferably, another layer of adhesion promoter is applied between the attachment material, which is preferably the same material as the composite material, and the partial dental prosthesis. The colored configuration of the overall structure and, therefore, the colored appearance of the finally applied partial dental prosthesis is advantageously controlled by coloring the attachment material and/or the adhesion promoter, as described above. The attachment material is advantageously present in a paste form. An LED lamp or the like, which is mentioned again in the following, can be used to cure the attachment material in a manner known per se. The shrinking process that occurs during the curing of the attachment material can be compensated for or arrested by means of the adhesion promoter. In general, however, the shrinkage that occurs during curing is relatively minor due to a correspondingly high filling ratio, i.e. a correspondingly high volume fraction of solid particles in the attachment material or in the composite material.

In order to provide the user, e.g. the dentist, with all the auxiliary means required for the treatment, apart from his normal equipment, a preferred embodiment of the invention provides a set having a plurality of preassembled, in particular differently sized and/or differently shaped partial dental prostheses according to the invention. In addition, the set can also preferably comprise liquid or paste-like attachment material and, optionally, various colors for coloring the attachment material. It is also possible, of course, to provide a plurality of already-colored, preferably liquid or paste-like attachment materials in the set. In addition, the set can also contain suitable etching agents and/or adhesion promoters or bondings. This ultimately makes it possible for the user or the dentist to search the set of partial dental prostheses provided to him for the size that comes closest to the natural situation on the posterior tooth or the stump of the posterior tooth to be treated. The remainder of the adaptation can be carried out by processing or specifically grinding this partial prosthesis at the site. For this purpose, the dentist or the user can access the standard grinding devices that are available to him. In addition, the dentist can search for the suitable color or the suitably prepared attachment material, if available, with which he attaches the partial dental prosthesis on the posterior tooth or the stump thereof, preferably via bonding, such that the desired color of the partial prosthesis then attached on the posterior tooth or the stump thereof is also obtained.

A method for producing partial dental prostheses according to the invention from the, e.g., commercially available and initially mentioned, composite material can have the following steps:

First, the composite material or the composite can be filled, with the organic binding agent and the solid particles, into cartridges for preparation and can be heated to approximately 100° Celsius, whereby the material can be softened for the subsequent further processing. The composite material can then be exposed to 80 to 100 bar pressure. The composite material, which has been pretreated in this manner in particular, is injected into a tooth mold, which is preferably designed to be translucent at least on one side. The tooth molds can be made from glass and chromium steel, for example. In order to cure the composite material in the tooth mold, the composite material can be heated to approximately 130° Celsius and can be thermally cured at this temperature for approximately 15 minutes. In addition, preferably at least during a portion of this time, e.g. during the first 10 of these 15 minutes, curing can also be carried out by the application of light through the regions of the tooth mold that are designed to be translucent. This can be carried out, e.g., by means of a suitable LED light. A suitable LED light is characterized, e.g., by a wavelength of 450 nanometers (nm) to 480 nm. By means of the light treatment, the properties of the illuminated surfaces can be improved via polymerization shrinkage. As a result, the solid particles on the illuminated surfaces are brought closer together. During the curing, the composite material in the tooth mold is preferably held under a pressure between 80 to 100 bar, which results in a good compression of all the material in the tooth mold. In order to support the described thermal or light-induced curing, suitable thermal initiators, such as, e.g., benzopinacol or 2,2'-dialkylbenzopinacol or suitable photoinitiators, such as, e.g., benzophenone, benzoin or derivatives, can be used as additives. Subsequent thereto, the partial dental prostheses can be cooled, preferably gradually, and can be removed from the tooth mold. To this end, the partial dental prostheses can be placed in a container having a nitrogen atmosphere in order to prevent oxidation of the organic binding agent. According to particularly favorable variants, laser light processing is carried out at least on the surface that will eventually form the chewing surface or on the entire outwardly facing surface of the partial dental prosthesis. The laser light can penetrate the material to a depth of, e.g., 80 micrometers. In the laser processing of the facial surfaces, the organic binding agent is removed from the treated surface of the partial dental prosthesis and the solid particles are melted or fused with one another or are sintered and, after conclusion of the laser treatment, form a continuous cured enamel layer as the surface of the partial dental prosthesis. This cured or glazed enamel layer can be seen in a cut through the partial dental prostheses and preferably has thicknesses between 20 and 40 micrometers (μm). The partial dental prosthesis can then be cut to fit or post-processed, e.g. by grinding or smoothing in any other manner.

BRIEF DESCRIPTION OF THE DRAWINGS

Further features and details of preferred embodiments of the invention are explained in the following with reference to illustrative embodiments.

DETAILED DESCRIPTION OF THE PREFERRED EMBODIMENTS

Figure 1:
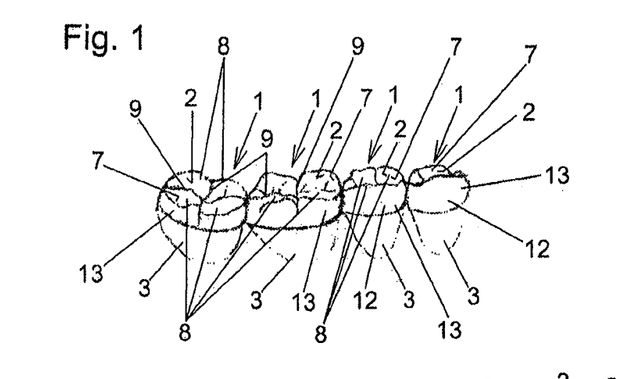
FIGS. 1 to 7 show illustrations of partial dental prostheses according to the invention for posterior teeth of the lower jaw.
Figure 2:
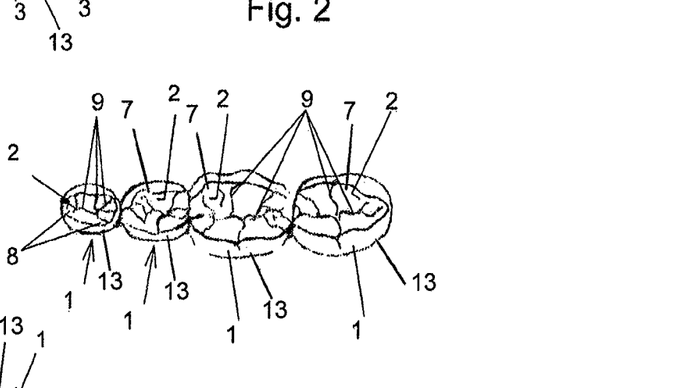

FIG. 1 shows a perspective side view, in which posterior teeth 3 worn down by abrasion have been restored by means of partial dental prostheses 1 according to the invention. The part of the remaining posterior teeth 3 that extends above the gums and is not covered by the respective partial dental prostheses 1 is visible. The surfaces 2 of the partial dental prostheses 1 that form the chewing surface are visible. Also shown are the side walls 12, which do not extend down to the gums in this embodiment. The partial dental prostheses 1 in this case are therefore the initially mentioned shells 13, which can also be referred to as onlays or overlays. Clearly visible on the surface 2 are the protuberances 8 and, disposed therebetween, fissures 9 of this artificially created surface 2 of the partial dental prosthesis 1. These are modeled after the natural shapes of healthy teeth. In the preferred embodiment that is shown, the entire outer surface of the respective partial dental prosthesis 1, i.e. the surfaces 2 forming the chewing surfaces as well as the outwardly facing surfaces of the side walls 12, are formed by a layer 7 comprising fused-together solid particles 6. The layer 7 in the embodiment shown is a continuous enamel layer. FIG. 2 shows a top view of this situation and, therefore, a top view of the surfaces 2 forming the chewing surfaces.

Figure 3:
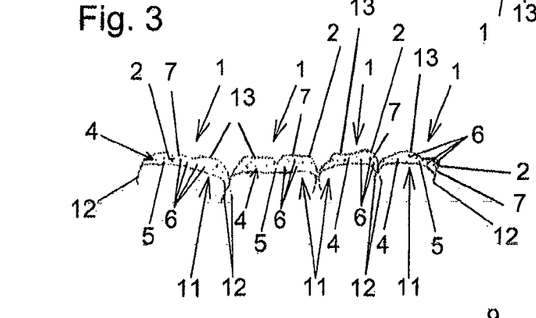

FIG. 3 shows a vertical section through the four partial dental prostheses 1, in which the veneered posterior teeth 3 are not shown. The very thin side walls 12 are shown particularly clearly here, as is the composite material 4 having the binding agent 5 and the solid particles 6 disposed therein. The illustration of the composite material 4 is a symbolic illustration that does not depict the true mixing ratios. As initially mentioned, these are preferably composite materials 4 having a volume fraction of solid particles 6 of at least 78%.

The illustration according to FIG. 3 also shows the hollow spaces 11 which, as explained further below, are filled with attachment material 16 and adhesion promoter 15 when the respective partial dental prosthesis 1 is mounted on the respective posterior tooth 3 that has been shortened due to abrasion. The vertical position of the partial dental prosthesis 1 and, therefore, the height of the finally veneered posterior tooth 3 can be set by means of a suitable quantity of attachment material 16 present in the hollow space 11.

Figure 4:
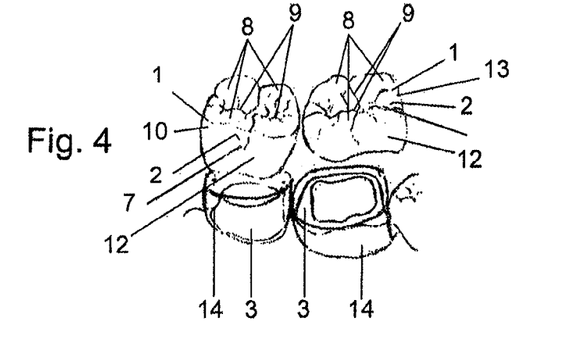

FIG. 4 shows not only a partial dental prosthesis 1 likewise designed as a shell 13, but also another partial dental prosthesis 1 designed as a hollow crown 10. Also shown is the situation before the partial dental prostheses 1 are placed onto the posterior teeth 3 to be restored. The difference between the embodiment as a hollow crown 10 and the embodiment as a shell 13 or an onlay or overlay lies substantially in the presence and/or length of the side walls 12. In the case of the hollow crown 10, the side walls 12 thereof extend down to the patient's gums in the finally applied state, whereas, in the variant in which the partial dental prosthesis 1 is designed as a shell 13, a portion of the original posterior tooth 3 is still visible between the side walls 12 and the gum in the finally applied form, as illustrated in FIG. 1.

The posterior tooth 3 to be restored by means of the hollow crown 10 is merely a tooth stump, which is inserted, via the region thereof protruding from the gums, entirely into the hollow space 11 of the hollow crown 10.

Figure 5:
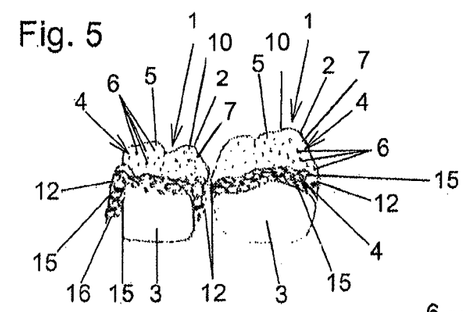
Figure 6:
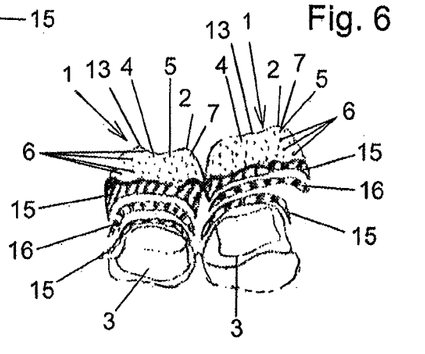
Figure 7:
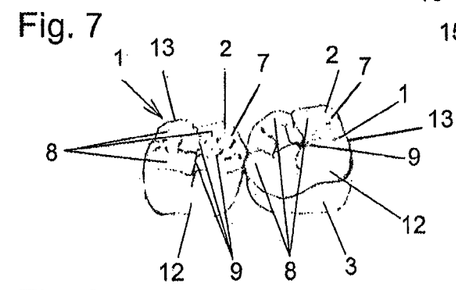

The matrix band 14, which is described in detail further below with respect to the use thereof, and which is known per se in the prior art, is used to simplify the application of the respective partial dental prostheses 1, said matrix band being placed around the respective posterior teeth 3. FIG. 7 shows a perspective view of the situation in which the partial dental prostheses 1 from FIG. 4 are finally applied onto the posterior teeth 3. FIG. 5 shows a vertical section through the situation according to FIG. 7. In FIG. 5, it is clear to see that a layer of adhesion promoter 15 is first applied onto the respective posterior tooth 3 to be treated. This is followed by a layer of attachment material 16. Advantageously, the attachment material 16 is the same material as the composite material 4 used to form the partial dental prosthesis 1. The height of the surface 2, which forms the chewing surface, above the gums can be set by means of the thickness of the layer of the attachment material 16. Another layer of adhesion promoter 15 is located between the layer of attachment material 16 and the surface of the respective partial dental prosthesis 1 bordering the hollow space 11. FIG. 6 shows the situation according to FIG. 5 in an exploded illustration, in order to more clearly show the individual layers. It should be noted that the thickness of the layers of adhesion promoter 15 and attachment material 16 are not shown to scale. The thickness of the layer of attachment material 16 is usually substantially higher than that of the adhesion promoter layers 15.

Figure 8:
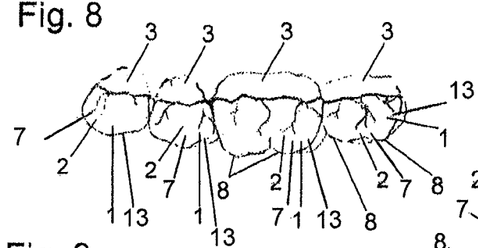
FIGS. 8 to 10 show illustrations of partial dental prostheses according to the invention for posterior teeth of the upper jaw.
Figure 9:
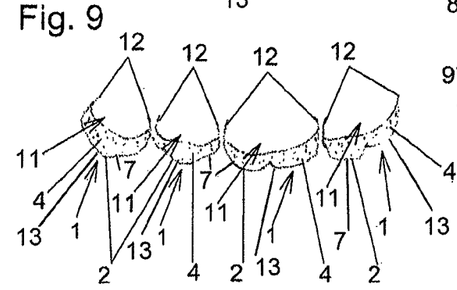
Figure 10:
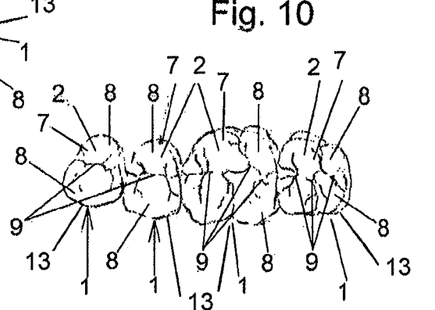

FIGS. 8 to 10 show four posterior teeth 3 of the upper jaw, which protrude from the gums and are not covered by the partial dental prostheses 1, which are also shown. The statements made with regard to FIGS. 1 to 3, i.e. with regard to the corresponding situation in the lower jaw, also apply in this case.

Figure 11:
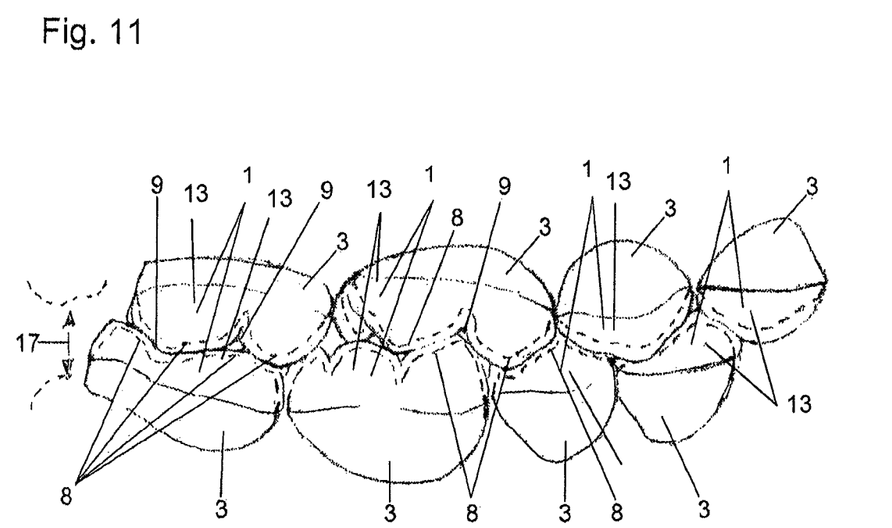
FIG. 11 shows posterior teeth of the upper and the lower jaw in the bite position, which posterior teeth have been built up by means of partial dental prostheses according to the invention.

FIG. 11 shows the posterior teeth 3 of the upper and the lower jaw veneered by means of the partial dental prostheses 1, wherein said posterior teeth rest against one another in the bite position via their surfaces 2, which form the chewing surfaces and are shaped by protuberances 8 and fissures 9. By applying the partial dental prostheses 1 onto the previously abraded posterior teeth 3, an optimal bite situation is restored, which eliminates the initially described problems. Reference number 17 shows the occlusal height before installation of the partial dental prostheses 1. The treatment has substantially increased the occlusal height.

Figure 12:
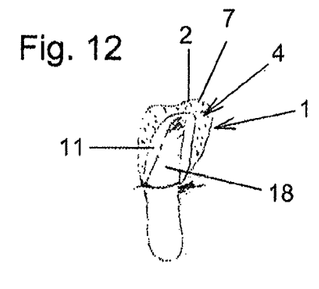
FIG. 12 shows a vertical section through a partial dental prosthesis according to the invention on an implant.

FIG. 12 shows, in a schematically illustrated vertical section, how a partial dental prosthesis 1 according to the invention, which is designed as a hollow crown 10, is placed onto an implant 18, which is disposed in the gums 18 or in the jaw bone in a known manner. The hollow space 11 of the hollow crown 10 is advantageously substantially larger than the part of the implant 18 inserted into said hollow crown. The remainder of the hollow space 11 is filled with adhesion promoter 15 and attachment material 16 in a manner analogous to that of the illustrations in FIGS. 5 and 6, which also results in the attachment of the partial dental prosthesis 1 on the implant 18. The substantially larger size of the hollow space 11 has the advantage that there is a relatively large amount of play when the partial dental prosthesis 1 is correctly oriented, and this play is not necessarily predetermined by the position of the implant 18. In this manner, it is possible to easily correct errors in the orientation of the implant 18. Advantageously, a similar approach is also used when tooth stumps, as shown in FIG. 4, are treated by means of hollow crowns 10. In this case as well, the hollow space 11 is advantageously slightly larger than the remaining tooth stump.

Figure 13:
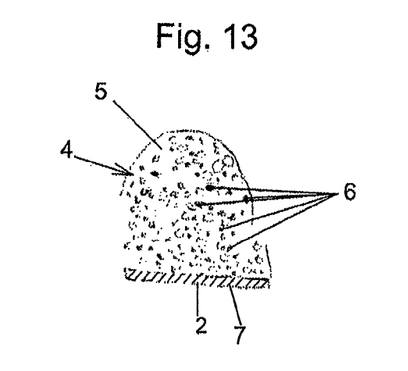
FIG. 13 shows a schematic illustration of the material build-up of the partial dental prostheses according to the invention.

FIG. 13 shows an enlarged and schematically illustrated section through the composite material 4 and the layer 7 of melted and fused solid particles 6 of a partial dental prosthesis 1, which layer 7 is disposed on the edge of said composite material 4 and forms the surface. Even though the volume ratios are not reproduced exactly here, it is clear to see how the solid particles 6 are embedded in the organic binding agent 5. The layer 7 of melted solid particles 6 is advantageously free of binding agent 5. In reality, said layer 7 can be made clearly visible in an appropriate cut through a corresponding partial dental prosthesis 1.

The manner in which the partial dental prostheses 1 according to the invention are applied onto posterior teeth 3 to be treated accordingly, i.e. the manner in which said partial dental prostheses 3 can be installed, is explained in greater detail in the following, as an example.

In a first variant, the posterior teeth 3 to be treated are initially prepared according to the prior art and are slightly etched by means of an etching agent. Next, the adhesion promoter 15 or the bonding is applied onto the thus prepared posterior teeth 3. The matrix bands 14 can then be applied around the posterior teeth 3 to be treated, which matrix bands are schematically illustrated in FIG. 4 and are known per se. By means of the matrix bands 14, the interdental as well as buccal and lingual tooth shapes can be built back up in a controlled manner in a plurality of layers consisting of attachment material 16. Instead of freely modeling the occlusal region, i.e. the region related to the chewing surface, as is known in the prior art, the partial dental prostheses 1 according to the invention are provided with adhesion promoter on the base thereof and are placed onto the attachment material. The attachment material can then be fixed by means of a polymerization lamp, whereby the partial dental prostheses 1 are fixed on the respective posterior tooth 3. The attachment material 16 is then in a type of sandwich position, as shown in FIG. 5, for example, between the prefabricated partial dental prosthesis 1 and the posterior tooth 3. After the attachment material 16 has cured, the matrix bands 14 can be removed. If necessary, the thus created reconstruction can be finally processed by means of rotating grinding devices or the like, which are of the type known for use in dentistry. The occlusions, i.e. the correct contact of the surface 2 forming the chewing surfaces in the bite position, can then be re-occluded, i.e. finally processed by means of grinding, provided this is necessary and until the desired contact points have been obtained. This can be monitored or colored by means of conventional contact point films, as is known in the prior art.

According to another type of application of the partial dental prostheses 1 onto the posterior teeth 3 to be veneered, models of the situation in the upper and the lower jaw that exists before the treatment are initially created, in a manner known per se, by means of an impression or the like. These upper and lower jaw models can then be articulated into a position that is appropriate for the skull, in an articulator, in a manner that is known in the prior art. Next, by appropriately adjusting the upper and the lower jaw models (which have been articulated into position) relative to one another, the situation, for the patient who is using the partial dental prostheses 1, that is intended to be achieved at the end of the treatment is set in the articulator. In so doing, gaps form between the upper and the lower jaw models in the articulator, which gaps represent the tooth substance that has been lost by abrasion of the natural posterior teeth 3. It is now possible to create occlusal splints in a manner known per se, e.g. from plastic, in the region of the posterior teeth, which occlusal splints fill these aforementioned gaps between the upper and the lower jaw models or the corresponding posterior teeth 3. The occlusal splints thus produced can be placed onto the abraded posterior teeth 3 as a test for the patient, and can be left there for a certain time period, e.g. one week, in order to determine, first of all, whether the occlusal splints make it possible to actually achieve the desired new position of the upper and the lower jaws relative to one another. If this test reveals that another readjustment is required, the occlusal splints can be reworked accordingly, e.g. by grinding in certain regions for proper fit, until the optimal position in the patient's mouth has been achieved. If a corresponding reworking of the occlusal splints is carried out, a corresponding readjustment of the position of the upper and the lower jaw models relative to one another is carried out in the articulator by means of the reworked occlusal splints, provided this is necessary. If the position of the upper and the lower jaw models relative to one another has finally been reached in the articulator, then, if appropriate after removing the occlusal splints, the intermediate spaces between the upper and the lower jaw models, which have been articulated into position in the articulator, are filled with silicone in the region of the posterior teeth 3 in order to produce bite registration elements for both posterior tooth regions. These bite registration elements are then shaped such that, when the patient bites onto them accordingly with the posterior teeth, the upper jaw and the lower jaw of the patient come into the position relative to one another that is intended to be achieved at the end of the treatment, i.e. after the final application of the partial dental prostheses 1 according to the invention on the posterior teeth 3 that are naturally still present.

The bite registration elements thus produced can then be used, in a different manner, for the application of the partial dental prostheses 1 on the posterior teeth 3.

In one of these uses, it is provided that the corresponding bite registration element is disposed in the articulator between the upper jaw model and the lower jaw model, on one side between the corresponding posterior teeth. On the other side, prostheses are then created, on the posterior teeth of the upper and the lower jaw models to be treated, initially with the attachment material 16 and, located thereon, with the partial dental prosthesis 1, wherein said prostheses, after having been produced and ground to fit if necessary, only need to be bonded at the corresponding point on the respective posterior tooth 3 of the patient. The exact vertical position of the partial dental prostheses 1 above the respective posterior teeth 3 can be set by opening and closing the articulator accordingly. It is possible that the attachment material 16 that has not hardened yet can be pressed out of the hollow spaces 10 of the respective partial dental prosthesis 1. However, this can be ground off in a suitable manner after the attachment material 16 has cured. The attachment material is cured in a suitable manner using LED light, as initially described. If one side has been finalized, the bite registration element can be removed in order to then process the other side accordingly. In this variant, the partial dental prostheses 1 can therefore be used, in the preassembled form thereof, for the dental technician to initially create prostheses having an exact fit for the particular patient situation on the corresponding upper and lower jaw models, which have been articulated into position, by underfilling the respective partial prosthesis 1 with the appropriate quantities of attachment material 16, wherein all that is left to do is for the dentist to attach said prostheses in the patient's mouth only on the posterior teeth 3 and to grind them for re-occlusion, if necessary.

According to another variant of the application of the prefabricated partial dental prostheses 1 according to the invention, one of the bite registration elements, which has been produced in the aforementioned manner, is disposed directly on one side in the patient's mouth, between the corresponding posterior teeth 3 of the upper and the lower jaw and, on the other side, the posterior teeth 3 to be treated are initially built up, after slightly etching the teeth if necessary, by means of adhesion promoter 15 and attachment material 16 and, lying thereon, by means of the prefabricated partial dental prostheses 1. In this variant, the dentist ultimately realizes the same procedure as that described above with respect to the dental technician using the articulator, although, in this variant, directly in the patient's mouth. The exact orientation of the partial dental prosthesis 1, in turn, can be achieved simply by biting down, since the exact orientation is predefined by the bite registration element. The attachment material 16 is again cured by means of an LED lamp. After curing, a final processing by means of grinding away for re-occlusion can be carried out directly in situ, if necessary.

The variant mentioned first and the variant mentioned last have the advantage that the application of the prefabricated partial dental prostheses 1 in the patient's mouth can be carried out rapidly and cost-effectively by the dentist in a single visit.

In summary, it should be noted that the partial dental prostheses according to the invention permit very rapid and cost-effective, user-friendly handling and have excellent processing properties. These are, inter alia, the easy and rapid polishability and the low shrinkage during the curing process due to the high filling ratio of solid particles. The partial dental prostheses 1 according to the invention have excellent abrasion behavior and very good physical properties. Due to the initially mentioned portions of zinc and fluorine in the solid particles 6, an antibacterial effect of the surfaces can be achieved in addition. The partial dental prostheses 1 according to the invention have fluorescences that appear very natural.

LEGEND FOR THE REFERENCE NUMBERS 1 partial dental prosthesis
2 surface
3 posterior tooth
4 composite material
5 binding agent
6 solid particle
7 layer
8 protuberance
9 fissure
10 hollow crown
11 hollow space
12 side wall
13 shell
14 matrix band
15 adhesion promoter
16 attachment material
17 original occlusal height
18 implant

The invention claimed is:

1. A method for producing partial dental prosthesis having at least one surface for forming a chewing surface of a posterior tooth, the method comprising:
   (i) providing a composite material with at least one organic binding agent and solid particles that consist of glass as filler; and
   (ii) applying a laser to at least some regions of a surface of the chewing surface in which the laser reaches a depth of 80 μm in the surface such that the at least one organic binding agent is burnt off in laser-treated regions and the solid particles are melted and fused together to form a continuous enamel layer.

2. The method of claim 1, further comprising the following step prior to step (ii):
   injecting the composite material with the at least one organic binding agent and the solid particles into a tooth mold, curing the composite material within the tooth mold, and removing the cured composite material from the tooth mold.

3. The method of claim 1, wherein an entire outwardly facing surface of the partial dental prosthesis is laser treated.

4. The method of claim 1, wherein the partial dental prosthesis has a thickness of 0.3 mm to 0.6 mm at the chewing surface.

5. The method of claim 1, wherein a thickness of the fused together solid particles is between 20 μm and 40 μm.

6. The method of claim 1, wherein the continuous enamel layer is formed exclusively from the fused together solid particles.

7. The method of claim 1, wherein the chewing surface comprises protuberances and fissures extending between the protuberances.

8. The method of claim 1, wherein a volume fraction of the solid particles relative to the composite material is at least 78%.

9. The method of claim 1, wherein the partial dental prosthesis has a shape of a hollow crown having side walls surrounding a hollow space of the hollow crown adapted to extend down to a patient's gums.

10. The method of claim 1, wherein the at least one organic binding agent comprises methacrylate.

11. The method of claim 1, wherein the solid particles comprise a mixture of different types of glass.

12. The method of claim 1, wherein the solid particles of the filler have particle sizes that differ from one another.

13. The method of claim 1, wherein the solid particles are inorganic.

14. The method of claim 1, further comprising cutting or grinding the partial dental prosthesis after applying the laser.

15. The method of claim 1, wherein the composite material includes a cured composite material in a core region below the continuous enamel layer after applying the laser.

\* \* \* \* \*